US012120393B2

(12) United States Patent
Dumauthioz et al.

(10) Patent No.: US 12,120,393 B2
(45) Date of Patent: Oct. 15, 2024

(54) METHOD FOR PROVIDING A CLIENT DEVICE WITH MANAGEMENT MESSAGES AND DEVICE FOR IMPLEMENTING THIS METHOD

(71) Applicant: Nagravision Sarl, Cheseaux-sur-Lausanne (CH)

(72) Inventors: Stéphane Dumauthioz, Cheseaux-sur-Lausanne (CH); Fabien Mathieu, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 356 days.

(21) Appl. No.: 17/783,600

(22) PCT Filed: Dec. 8, 2020

(86) PCT No.: PCT/EP2020/085079
§ 371 (c)(1),
(2) Date: Jun. 8, 2022

(87) PCT Pub. No.: WO2021/122157
PCT Pub. Date: Jun. 24, 2021

(65) Prior Publication Data
US 2023/0028467 A1   Jan. 26, 2023

(30) Foreign Application Priority Data
Dec. 19, 2019   (EP) ..................... 19217960

(51) Int. Cl.
*H04N 21/4623*   (2011.01)
*H04N 21/266*   (2011.01)
*H04N 21/6334*   (2011.01)

(52) U.S. Cl.
CPC ... *H04N 21/4623* (2013.01); *H04N 21/26606* (2013.01); *H04N 21/6334* (2013.01)

(58) Field of Classification Search
None
See application file for complete search history.

(56) References Cited

U.S. PATENT DOCUMENTS

| 2004/0045028 | A1  | 3/2004 | Harris |
| 2006/0059342 | A1* | 3/2006 | Medvinsky ...... H04N 21/26613 713/168 |

(Continued)

OTHER PUBLICATIONS

International Search Report and Written Opinion issued Mar. 3, 2021, in PCT/EP2020/085079 filed Dec. 8, 2020, 8 pages.

(Continued)

*Primary Examiner* — Omar S Parra
(74) *Attorney, Agent, or Firm* — Oblon, McClelland, Maier & Neustadt, L.L.P.

(57) ABSTRACT

Method for providing at least one client device (10), from a server (20) configured to control access to audio/video content, with management messages (40), comprising: —determining a first set (41) of management messages pertaining to said client device (10), —transmitting said first set through a first communication channel (51) in a repetitive manner, —receiving, from said client device, a notification (15) comprising at least a client device identifier (11), —determining a second set (42) of management messages, said second set comprising all or part of the first set, —determining a token (45) associated with the second set, —receiving, from the client device, a confirmation (15') comprising data pertaining to the token, —verifying the data pertaining to the token and, in case of a positive verification, removing all or part of the second set from the transmission through the first communication channel.

15 Claims, 3 Drawing Sheets

(56) References Cited

U.S. PATENT DOCUMENTS

| | | |
|---|---|---|
| 2007/0180231 A1 | 8/2007 | Morten et al. |
| 2008/0294786 A1 | 11/2008 | Tinker et al. |
| 2010/0070588 A1 | 3/2010 | Sinn et al. |
| 2013/0014160 A1 | 1/2013 | Harris |
| 2017/0180770 A1 | 6/2017 | Harris |

OTHER PUBLICATIONS

European Search Report issued May 25, 2020, in European Patent Application No. 19217960.4 filed Dec. 19, 2019, 7 pages.

* cited by examiner

METHOD FOR PROVIDING A CLIENT DEVICE WITH MANAGEMENT MESSAGES AND DEVICE FOR IMPLEMENTING THIS METHOD

TECHNICAL FIELD

The present disclosure relates to the field of digital data delivery such as contents transmitted from a provider to client devices in Pay-TV for instance. More specifically, this disclosure relates to a method for providing client devices with management messages which may typically be required for getting access to audio/video contents.

BACKGROUND

Within a Pay-TV environment or any other field relating to conditional access content delivery, a content of audio/video (NV) type is encrypted using keys referred as to Control Words (CW). These control words are designed to be changed regularly, typically every minute, for securing purpose. Thanks to the CWs, the content is scrambled and transmitted from the content provider, i.e. from the head-end, to the receivers also called client devices. Especially for Pay-TV, the transmission is typically achieved using a broadcast or multicast method, so that the same scrambled content is transmitted to a plurality of client devices.

The CWs are encrypted using a transmission key (TK) which changes with a much lower frequency, for example every month. An encrypted CW is typically carried within an Entitlement Control message (ECM) together with access conditions (AC) describing the required rights the client device has to possess to be authorized to access the related content. These rights are regularly transmitted to the client device in an encrypted form by means of Entitlement Management Messages (EMM). The EMMs are typically further encrypted using a personal key (PK), which is unique to the client device, or using other keys which may be shared by several client devices. The scrambled content, the ECMs and the EMMs are typically transmitted through a so-called Transport Stream (TS) from the head-end to the client devices.

The delivery of EMMs to the client devices is usually achieved through a one-way broadcast system. Traditionally, such a system involves the repeated and periodic transmission of EMMs to maximize the probability of reception. Within a Conditional Access System (CAS), the EMMs are typically stored in a so-called carousel located at the head-end and are inserted within the transport stream in a repetitive manner. The time between two emissions of a given EMM (i.e. the repetition rate) and the period of time over which a message is repeated (i.e. the broadcast duration) are chosen as a trade-off between the cost, expressed in terms of bandwidth, and the benefits, expressed in both the average time to reception and the probability of reception which depends on the client device listening behavior.

However, such a system presents several issues. Indeed, the head-end is unable to know if a specific client device is ready to listen or to receive the EMMs that are intended for it. Accordingly, the head-end cannot know when to start sending an EMM and does not know when to remove such a message from the carousel. This leads to an inefficient use of broadcast bandwidth.

A client device may also miss messages if it listens to messages for a duration that is shorter than the repetition rate. The shorter the duration a client device listens to messages, the higher the probability of missing messages.

A variant of failure of message reception is the incomplete reception of EMMs where the client device receives only a subset of EMMs that may be required to get access to a scrambled content. If, for any reason, the client device stops listening prior to the reception of all messages intended for this device, the message reception will be incomplete. Once again, the head-end remains unable to know whether or not the entire set of EMMs assigned to this client device has been received.

Another issue relates to the inefficient reception of sequential messages. If a set of messages must be received in a specific order, the client device might have to listen to incoming messages for a duration that is up to twice the message broadcast duration. Indeed, if the client device misses the first message, subsequent messages will be generally discarded until the first message is received, at which time sequential message reception starts.

The head-end periodically sends messages from the carousel to renew each client device's right to access protected content. If a client device is no longer entitled to access content, the client device renewal messages are no longer broadcast and the client device's right to access content expires. Therefore, if a client device is not active enough, it may miss the EMMs required to renew its right to access content and unwanted access loss may result.

Another issue relates to the long activation time. The client device requires the reception of a set of EMMs. If it is not active when activation messages are sent, the client device may have to way up to two message repetition rates to finally get access. Any delay frustrates the end users, may generate calls to the call center and may increase the time an installer stays at the client device's home.

Document US2010/0070588A1 relates to instant messaging, namely text messages such as SMS exchanged between two client devices, and intends to increase reliability of exchanged messages using message-specific acknowledgements. However, adding specific acknowledgement messages in the exchanges does not help to reduce the amount of exchanged data and therefore does not allow to improve bandwidth utilization.

Accordingly there is a need for improving systems and processes for providing client devices with management messages, in order to at least partially overcome the aforementioned issues and drawbacks.

SUMMARY OF THE SOLUTION

To address this concern, the present disclosure suggests, as a first aspect, a method for providing at least one client device, from a server configured to control access to audio/video content, with management messages. This method comprises:

determining a first set of management messages pertaining to said client device by selecting management messages assigned to said client device among a plurality of management messages assigned to a plurality of client devices, transmitting said first set of management messages through a first communication channel in a repetitive manner, so as to repeat the transmission of said first set of management messages, receiving a notification from said client device, said notification comprising at least a client device identifier and being a request for receiving management messages assigned to the client device, determining a second set of management messages, said
second set comprising all or part of the first set of
management messages,
determining a token associated with the second set of
management messages,
receiving a confirmation from the client device, said
confirmation comprising data pertaining to the token,
verifying the data pertaining to the token and, in case of
a positive verification, removing all or part of the
second set of management messages from the trans-
mission through the first communication channel.

Thanks to present solution, the bandwidth needed to transmit the management messages can be reduced given that at least a part of the first set of management messages can be advantageously safely removed from the management message transmission repeatedly performed through the first communication channel. In addition, thanks to such a message removal, the number of management messages stored in the carousel can be decreased thus shortening the time period for transmitting all the remaining management messages to the other related client devices. Accordingly, the repetition rate of the remaining management messages can be significantly increased. Furthermore, the quality of service can be further improved since the client device is able to positively request the provision of requested management messages when at least one of its access right is about to expire. Accordingly, the client device can advantageously adopt a pro-active behavior and is no longer considered as a passive terminal device having no other choice than waiting for receiving management messages from the head-end or the CAS.

According to a specific embodiment, the token is derived from the second set of management messages, and the token and the second set are determined by the server and/or by the client device.

According to another embodiment, the token is further transmitted to the client device if the token and the second set have been determined by the server.

Preferably, the second set of management messages is further transmitted to the client device, still preferably together with the token.

According to a further embodiment, at least one of: the notification, the token, the second set of management messages and the confirmation is transmitted through a second communication channel.

Preferably, at least one of: the notification, the token, the second set of management messages and the confirmation is transmitted in an encrypted form.

According to one embodiment, data pertaining to the token comprises at least one of: the token itself, a signature of the token, a token encryption, a token signature encryption and a hash applied to any of such items.

In accordance with a preferred embodiment:
each management message of the first set is associated
with a first marker configured to determine when the
management message has been generated,
the token includes at least one of: the client device
identifier and a second marker, said second marker
being configured to determine the most recent manage-
ment message transmitted to the client device, and
the second set is determined according to the second
marker.

Preferably, the management messages of the first set are stored in a chronological order.

According to a preferred embodiment, the first communication channel is a broadcast or multicast channel, and the second communication channel is a unicast channel, preferably a bidirectional channel.

According to one embodiment, the second set comprises management messages pertaining to at least said client device, namely personal management messages pertaining to said client device and non-personal management messages (e.g. shared or global management messages) pertaining to the client device and to at least one another client device.

In one embodiment, the confirmation occurs if a processing of the management messages of the second set is successful.

Preferably, receiving the notification occurs:
only once during a configurable period of the client
device,
upon an expiration of a predetermined or random delay
after powering on the client device,
after receiving an authorization for sending the notifica-
tion,
when at least one access right assigned to said client
device to access to a multimedia content is expired or
is about to expire, for example within one week,
preferably within less than six, five, four, three two
days, still preferably within less than a day.

According to a second aspect, the present disclosure also relates to a server for controlling access to audio/video content and providing at least one client device with management messages, said server comprising:
a unit configured to determine a first set of management
messages pertaining to said client device by selecting
management messages assigned to said client device
among a plurality of management messages assigned to
a plurality of client devices,
at least one communication interface configured to trans-
mit said first set through a first communication channel,
in a repetitive manner so as to repeat the transmission
of said first set of management messages, and to receive
a notification from said client device, said notification
comprising a client device identifier and being a request
for receiving management messages assigned to the
client device,
at least one processing unit configured to:
determine a second set of management messages, said
second set comprising all or part of the first set of
management messages,
determine a token associated with the second set of
management messages,
the communication interface being further configured to
receive a confirmation from the client device, said confir-
mation comprising the client device identifier and data
pertaining to the token, and
the processing unit being further configured to verify said
data pertaining to the token and, in case of positive verifi-
cation, to remove all or part of the second set of management
messages from the transmission through the first communi-
cation channel.

According to a third aspect, the present disclosure further relates to a client device for receiving management messages provided by a server configured to control access to audio/video content, said client device comprising:
at least one communication interface configured to:
receive, through a first communication channel, a first
set of management messages pertaining to said client
device,
transmit a notification to the server, said notification
comprising at least a client device identifier and being a request for receiving management messages assigned to said client device, receive a second set of management messages, said second set comprising all or part of the first set of management messages, at least one processing unit configured to:

generate said notification, process the second set of management messages and, in case of successful processing, determine a confirmation comprising data pertaining to a token, the communication interface being further configured to send the confirmation to the server.

Other embodiments will be disclosed in the detailed description.

BRIEF DESCRIPTION OF THE DRAWINGS

The solution and the embodiments suggested in the present disclosure should be taken as non-limitative examples and will be better understood with reference to the attached figures in which.

Figure 1:
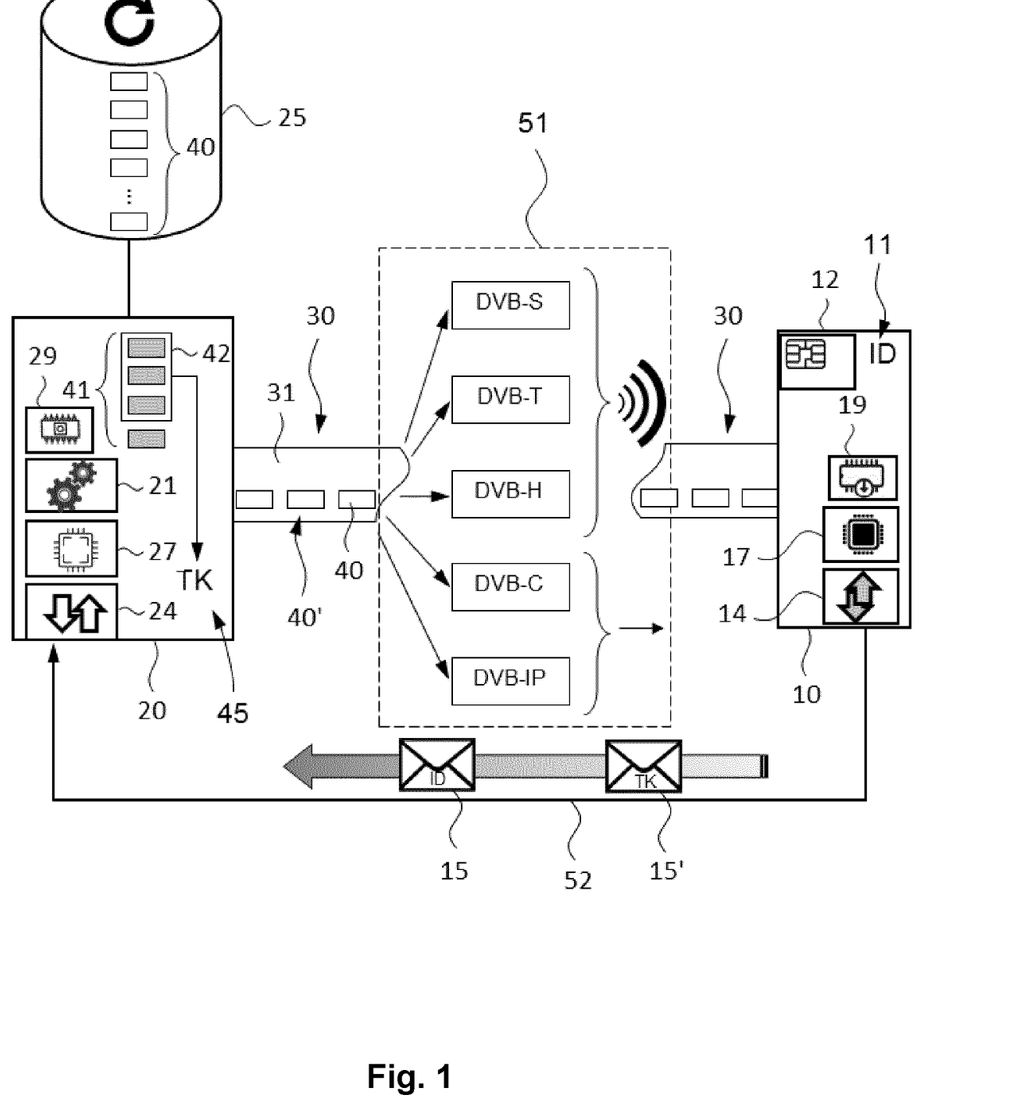
FIG. 1 is a schematic overview of means and entities that could be involved in the present solution.

Referring to FIG. 1, the latter illustrates the general environment through which the method of the present solution may be implemented. The two main entities shown in this figure are a client device 10 and a server 20 located respectively on the right and left sides of FIG. 1. The client device 10 is typically a customer premise equipment such as a set-top-box, a personal computer, a tablet computer or any other electronic receiver or multimedia unit able to process at least one protected digital audio/video (NV) stream received from the server 20. The AN stream is designed to carry at least one multimedia content 31. The server can be regarded as a content provider or a broadcaster. It can be also considered as a head-end and typically includes a conditional access system (CAS) to scramble (i.e. to encrypt) the multimedia content 31. Accordingly, the server is typically configured to control access to audio/video content, preferably within a Pay-TV environment. The CAS is also in charge of providing the client device 10 with appropriate encrypted conditional access messages 40' required to descramble the multimedia content. Several multimedia contents 31, e.g. one per TV channel, may be simultaneously provided by the server 20. These streams, namely NV contents and data streams, form all together a so-called transport stream (TS) 30.

The transport stream 30 is transmitted to the client device 10 through a first communication channel 51. As schematically shown in FIG. 1, the first communication channel can be a wire or wireless channel. Moreover, different types of wire communication channels can be considered, such as a cable communication channel or a channel based on an Internet Protocol. With reference to the Digital Video Broadcasting standard taken here as example, the wired communication channels are respectively referred to as DVB-C and DVB-IP in FIG. 1. Regarding the wireless communication channels, the specifications DVB-S, DVB-T and DVB-H respectively refer to a satellite communication channel, a terrestrial communication channel and to a mobile broadband Internet access for cellular phones and/or mobile TV receivers.

Although a single client device 10 has been shown in FIG. 1, it should be understood that, in a broadcast or multicast environment, a plurality of client devices (typically several tens of thousand or million of them) are usually connected to the first communication channel 51 (or network) to receive the transport stream 30 delivered by the server 20. It should be pointed out that the server 20 is an entity that is different from any of the client devices and thus cannot be considered as a client device. Indeed, the server is a master device which is entitled to control access to NV content delivered to the client devices which, therefore, may be regarded as slave devices. Controlling access to NV content makes sense, especially if the content is provided to the client devices as a pay-service.

Within the context of Pay-TV or any other paid service, only authorized end users (i.e. subscribers) are allowed to descramble at least a part of the multimedia contents carried by the transport stream 30. This transport stream 30 usually comprises scrambled NV content packets and scrambled conditional access messages 40' which typically refer to Entitlement Control Messages (ECM) and Entitlement Management Messages (EMM). The ECM is a control message relating to content packets, whereas the EMM is a management message 40 dedicated to an individual end user (subscriber or client device) or a group of end users. The management messages 40 may be regarded as one of the key elements for providing access to pay-services delivered by the server 20.

The ECM contains the access conditions (AC) for the current broadcast event together with control words (CW) for unscrambling this event. The control word (CW) is a key used for decrypting the content packets of a packetized event broadcasted within the transport stream 30 which is generally output from a multiplexer. Thus, each ECM is specific to each event (e.g. a TV program), whereas the EMM is typically used to set, reset or change product access entitlements, credit, etc. . . . . . Thus, EMMs refer to the rights (access data) of the subscriber for getting access to the content (events).

The conditional access messages 40' (ECMs and EMMs) are typically processed by a security module 12 located in the client device or connected to the latter. Such a security module 12 may be a smart card which can be inserted into a slot of a conditional access reader connected to the client device. Other implementations of the security module exist. For instance, it can be directly soldered inside the client device, it can be provided as a circuit on a socket such as a SIM module, it can be integrated on a chip or it can also be implemented in software.

The CWs are changed at regular intervals (typically between 5 and 20 seconds) to deter any attack against such CWs. Accordingly, ECMs are transmitted at a much higher frequency, for example every 100 milliseconds. On the other hand, since the access rights contained in the EMMs usually depend on the subscription of the end user, there is no need to frequently transmit the EMMs. For this reason, the EMMs may conceptually transmitted by the server to the client device on a monthly basis for instance, namely at time intervals which are much longer than those for providing the CWs through the ECMs.

Although EMMs have been disclosed as example of management messages (MM) 40, it should be noted that other kind of management messages 40 may be delivered by the server 20 to the client device 10. Indeed, if the EMMs are specifically designed to provide access rights (AR) to the client device 10, other data or information such as fingerprinting configurations, pop-up messages, new PIN codes, for example, may be provided through management messages 40.

Since the server 20 has no means to know which client devices are currently connected to the first communication channel 51, the management messages 40 must be provided through this channel at regularly time intervals, even if they are changed or updated much less frequently than other type of messages. For these reasons, management messages 40 are typically stored in a so-called carousel 25 or directory, linked to the server 20, and are transmitted or broadcasted in repetitive manner, e.g. continuously one after the other. Accordingly, when a client device is powered on whereas it was not connected to the first communication channel for a long time, it can shortly retrieve the required management messages to get access to the scrambled NV streams for instance.

However, providing management messages 40 on a regularly basis to a large number of client devices 10 results, among other things, high consumption of bandwidth and computer resources. The method of the present solution intends to overcome at least a part of these drawbacks. To this end, the present disclosure suggests a method for providing at least one client device 10, from a server 20, with management messages 40, the method comprising:

determining a first set 41 of management messages 40 pertaining to the client device 10 by selecting management messages assigned to said client device 10 among a plurality of management messages 40 assigned to a plurality of client devices, transmitting said first set 41 of management messages through a first communication channel 51 in a repetitive manner, so as to repeat the transmission of said first set 41 of management messages, receiving a notification 15 from the client device 10, this notification 15 comprising at least a client device identifier 11 (i.e. the identifier 11 of the aforementioned client device 10) and being a request for receiving management messages 40 assigned to the client device 10, determining a second set 42 of management messages 40, this second set 42 comprising all or part of the first set 41 of management messages 40, determining a token 45 associated with the second set 42 of management messages, receiving a confirmation 15' from the client device 10, this confirmation comprising data pertaining to the token 45, and verifying the data pertaining to the token 45 and, in case of a positive verification, removing all or part of the second set 42 of management messages 40 from the transmission through the first communication channel 51.

The step aiming to determine the first set 41 of management messages 40 pertaining to the client device 10 aims to select management messages assigned to this client device 10 among a plurality of management messages 40 assigned to a plurality of client devices (i.e. to a plurality of other client devices). This step may be performed on the basis of the identifier 11 of the client device 10, for example if such an identifier is associated to the management messages 40 stored in any database linked to the server 20. Typically, this step may be regarded as extracting, e.g. from the carousel 25 or any other database, a first set 41 of management messages pertaining to the client device 10. The transmission of this first set 41 through the first communication channel 51 in a repetitive manner may be obtained e.g. by placing the first set 41 of management messages in a carousel 25 which may be configured to repeatedly provide the server with management messages 40 stored therein. In other words, the entire management messages 40 of this first set 41 are transmitted again each time the transmission of the first set 41 is repeated. The server can include this first set 41 within the transport stream 30 which is then transmitted to the client device 10 using any type (wire or wireless) of communication link, through the first communication channel 51.

The notification 15 is generated by the client device 10 and may be regarded as a request for receiving management messages 40 assigned to the client device 10, more specifically to the identifier 11 of this client device.

The token 45 is typically a number (or an alphanumerical string) which is generated in association with the second set 42 of management messages, so as to identify this second set. Preferably, the token comprises enough digits, so that there is almost no chance for a third party to generate the same token from a random selection. It should be noted that the fact that the token is generated in association with the second set 42, does not necessary imply that this token is generated on the basis of information comprised in this second set 42. Nevertheless, this remains a possible way, as explained later on.

Preferably, the confirmation 15' generated and sent by the client device 10 further comprises the identifier 11 of this client device, so as to clearly identify the sender of the confirmation 15'.

The steps of this method may be implemented according to several ways. A first way is to consider that the second set 42 of management messages is generated by the server 20. In such a case, the server 20 may further transmit this second set 42 to the client device. However, according to another way, the second set 42 may be determined by the client device 10, for example on the basis of management messages 40 previously received from the server 20.

Whatever the implementation, the second set 42 preferably comprises all the management messages 40 of the first set 41 of management messages pertaining to the client device 10. However, the second set 42 may comprise a part of the first set 41, typically if the first set 41 comprises too many management messages and should be split in several batches or subsets.

According to a preferred way, the token 45 is generated and transmitted by the server 20 to the client device 10. However, this token 45 may be also generated by the client device 10 according to a common algorithm or a protocol defined in advance between the server and the client device. For example, the token 45 may be derived from the received messages, typically from identifiers of the management messages comprised in the received messages.

Moreover, if this token is generated from a common algorithm known both by the server and by the client device, it may be no requirement to transmit this token 45 through the first communication channel 51, either from the server to the client device or from the client device to the server. In this case, each management messages may include information stating that this message is part of a specific batch or subset which may comprise n management messages. Therefore, the client device may check on its own side whether it has received all the management messages of a batch or subset of management messages and may generate the token 45 accordingly. This batch or subset may typically be referred to as the second set 42.

The confirmation 15' sent by the client device may comprise the client device identifier 11 and data pertaining to the token 45. Such data may be a signature of the token for instance. Since the management messages are initially transmitted by the server, typically from the carousel 25, and since the algorithms to generate the token and its signature may be also known by the server, the latter may be able to identify the management messages 40 to which the client device refers through the second set 42.

According to another way, the token 45 may be sent by the server after being generated e.g. on the basis of identifiers of management messages comprised in the second set 42. In response, the client device may transmit to the server the signature of this token within the confirmation 15'. Such a confirmation may intend to attest that the client device has received all the management messages 40 of the second set 42. In this regard, the client device may be able to identify e.g. the identifiers of the management messages to which the token refers. This may be done on the basis of the common algorithm shared by the server and the client device for generating the token 45. In addition, it should be noted that both the server and the client device know that the management messages to which the token refers may result from a batch or subset, denoted second set 42 in the present disclosure, and may not result from management messages extracted from several subsets. Accordingly, the identification of a management message as being part of a certain batch or subset may be performed within the protocol used to transmit these messages or within these messages themselves, e.g. on the basis of a specific rule or standard.

Whatever the way or the manner chosen to implement the method through the above-listed steps, this process allows to identify, at the server 20, the management messages 40 that the client device 10 has received from this server, either via the transmission of first set 41 or the second set 42. As a result, the server can safely remove, from the transmission through the first communication channel 51, all or part of the management messages of the related set, more specifically, the personal management messages of this client device. Indeed, some management messages, referred as to global or shared messages, should not me removed from such a transmission given that they are not assigned to a single client device, i.e. to the relevant specific client device 10. The message removal may be achieved by removing these management messages from the carousel 25, so that they are no longer broadcasted in a repetitive manner by the server. However, instead of removing these (personal) management messages from the carousel, one may also consider preventing their insertion within the transport stream 30, e.g. by marking these messages as being not for transmission.

Thanks to this solution, the bandwidth assigned to the transmission of the management messages 40 can advantageously be reduced, while reducing the transmission period of the remaining management messages stored in the carousel for other client devices. In addition, such a solution also improves the quality of services offered to users of connected client devices (e.g. subscribers to digital TV services) by:

avoiding unwanted access loss and subsequent troubleshooting,
reducing client device installation time,
providing faster reception of subscription service modifications.

In this regard, it should be noted that a client device is referred as to being "connected" if it is able to send a notification 15 or a confirmation 15' to the server.

Advantageously, the present solution also improves the quality of services offered to users of non-connected client devices by:

reducing the probability of unwanted access loss and subsequent trouble shooting,
reducing initial client device installation time, and
providing faster reception of subscription service modifications.

Furthermore, this solution also reduces customer support and installation costs for digital TV operators. As general observation, one can note that the challenge aiming to maximize the quality of services offered to the client device users while minimizing connectivity costs (especially in terms of bandwidth and time to receive the appropriate management message from the carousel) can be reached.

According to a preferred embodiment, the token 45 is derived from the second set 42 of management messages 40. Furthermore, the token 45 and this second set are determined by the server 20 and/or by the client device 10. The token may be obtained, at least in part, on the basis of the second set 42, for example on the basis of the identifiers of the management messages comprised in this second set 42.

According to one embodiment, the token 45 is further transmitted to the client device 10, especially if the token and the second set have been determined by the server.

Still preferably, the second set 42 is further transmitted to the client device 10, for instance together with the token 45. Such a transmission may be provided in response to the notification 15 received by the server from the client device.

The messages, notifications, requests, responses or any other information exchanged between the server and the client device may be transmitted through the first communication channel 51 if this latter is a two-way channel, namely a bidirectional channel. However, in a broadcast or multicast environment, the first communication channel 51 commonly relates to a one-way channel given that the server aims to cover, e.g. through a satellite or terrestrial communication channel, a large number of client devices by broadcasting the transport stream 30 over the air. For this reason, at least one of: the notification 15, the token 45, the second set 42 of management messages and the confirmation 15' is preferably transmitted through a second communication channel 52. Such a second communication channel may be a return path established between the client device and the server, e.g. using an IP-channel or a communication network such as the Internet.

According to one embodiment, at least one of: the notification 15, the token 45, the second set 42 of management messages and the confirmation 15' is transmitted in an encrypted form. Such an encryption may be based on a symmetric encryption scheme or on an asymmetric scheme, namely on a pair of private-public cryptographic keys. Several commonly used cryptographic algorithms, such as AES or RSA, may be applied to data or information exchanged between the client device and the server for their encryption.

According to another embodiment, data comprised in the confirmation 15' sent by the client device may refer to any data pertaining to the token 45. For example, such data may comprise at least one of the token itself, a signature of the token, a token encryption, a token signature encryption or a hash applied to any of these items. The signature of the token may be obtained using a hash function applied to the token 45 in order to get a digest. Then, this digest may be encrypted using a private or personal key of the client device to get a so-called signature of the token.

The step aiming to verify, at the server 20, the data pertaining to the token 45 may be performed by comparing the data comprised in the confirmation 15' sent by the client device with corresponding data stored at the server or with data derived from information stored on the server side. For example, if said data refers to the signature of the token, this signature may be determined by the server which typically know the token (especially if it has sent it to the client device) and may be aware of the (shared) hash function applied on this token by the client device.

In this way, the server may be able to determine the digest and may compare this digest with that extracted from the signature after having decrypted the latter using the appropriate decryption key. If there is a match upon such a comparison, the verification will be regarded as being positive or, in other words, the signature comprised in the confirmation 15 will be determined as being valid or authentic.

Signing the token will preferably be performed using a cryptographically strong authentication function to authenticate the client device instance. Such an operation prevents DoS attacks (Denial of Service attacks) that would let a malicious actor request management messages for all client devices and systematically return the token in view to remove all management messages from the carousel 25. Instead of signing the token, the client device may hash the token using a specific hash function that may be secret to remain unknown from malicious persons.

Figure 2:
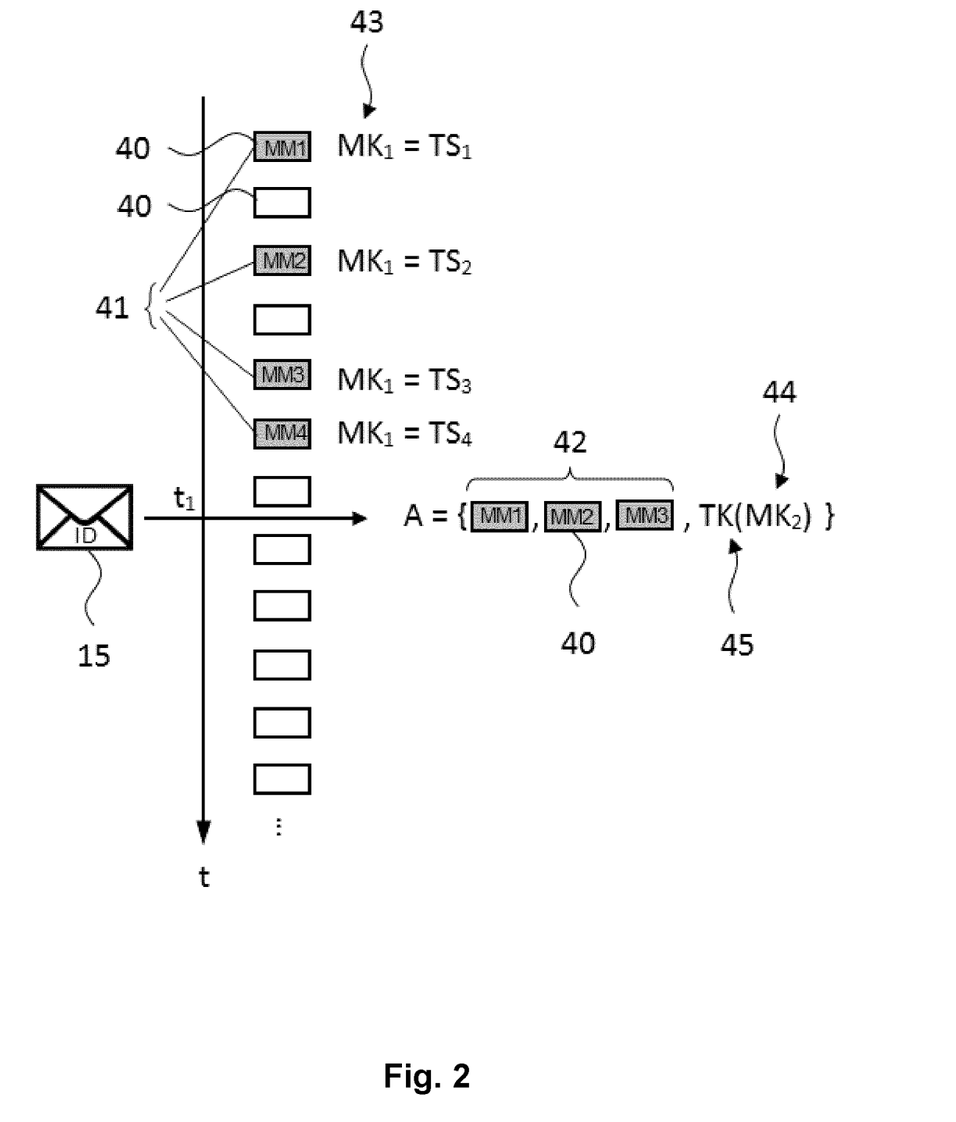
FIG. 2 is a schematic illustration, of a chronology of certain events occurring at the server in connection with the management messages generated by the server.

FIG. 2 shows a chronology of certain events that may occur at the server 20 in connection with the management messages 40 generated by this server or by the conditional access system (CAS) assigned to this server.

As shown in this figure, the management messages 40 are successively generated by the server along a time axis t for all the client devices 10. These management messages may typically be stored in the carousel 25 in view to be transmitted through the first communication channel 51 in a repetitive manner.

As an example, four management messages 40 (MM1, MM2, MM3 and MM4) pertaining to a specific client device 10 form the first set 41 determined by the server. These four management messages are greyed out to better identify them in the series of management messages successively provided by the server. These four management messages may correspond to those which are also greyed out in FIG. 1 and which pertain to the client device 10 according to FIG. 1.

A first marker ($MK_1$) 43 may be associated to each management messages 40. This first marker 43 may typically be a timestamp. Accordingly, the first marker 43 of the first management message MM1 pertaining to the client device 10 may be a first timestamp $TS_1$, the first marker 43 of the second management message MM2 may be a second timestamp $TS_2$ and the first markers of the two other management messages MM3 and MM4 may respectively be a third timestamp $TS_3$ and a fourth timestamp $TS_4$.

Preferably, the management messages 43 of the first set 41 are stored in a chronological order, so that the first timestamp $TS_1$ is the oldest timestamp and the fourth timestamp $TS_4$ is the youngest timestamp of the first set 41.

In an instant t1, the server 20 receives a notification 15 from the client device 10. This notification may typically inform the server that this client device is connected and may be ready to receive management messages assigned thereto. In such a view, the notification 15 may be regarded as a request for receiving management messages pertaining to this client device. Once the notification 15 has been received by the server, the latter determines the first set 41 of management messages pertaining to the client device identified thanks to the client device identifier 11 comprised in the notification. In the example of FIG. 2, the first set 41 comprises the aforementioned four management messages.

Then, the server preferably determines a second set 42 of management messages. In the example of FIG. 2, this second set comprises a part of the management messages of the first set 41, namely the first three management messages MM1, MM2 and MM3. According to a preferred embodiment, a token 45 associated with the second set 42 is determined by the server. Still preferably, the token includes at least one of: the client device identifier 11 and a second marker ($MK_2$) 44. This second marker 44 is preferably configured to determine the most recent management message transmitted to the client device. Therefore, in the example of FIG. 2, the second marker 42 is the timestamp $TS_3$, namely the first marker 43 of the third management message MM3 which corresponds to the last management message 40 of the second set 42.

Preferably, the second set 42 and the token 45 are included together in an answer "A" to be transmitted by the server to the client device in response to its notification 15. Upon receipt of the answer A, the client device transmits a confirmation 15' to the server as an acknowledgment. This confirmation 15' comprises data pertaining to the token and preferably further comprises the client device identifier 11. Data pertaining to the token may typically be a signature of the token 45 which attests that the second set 42 of management messages has been duly received by the client device and preferably that the management messages of this second set 42 have been successfully processed by the client device, more particularly by the security module 12 of this client device. In this concept, the token 45 is only used for the second set 42 for which it has been associated and each time a new second set 42 is determined, a new token 45 associated to this new second set is also determined.

Once the confirmation 15' is received by the server, the latter verifies the data pertaining to this token. In this example, the server verifies the signature of the token 45 and, in case of positive verification (i.e. in case the signature is authentic), the server prevents at least a part of the second set 42 of management messages from being further transmitted in a repetitive manner through the first communication channel 51. Typically, this can be achieved by removing the management messages 40 of the second set 42 from the carousel 25, more specifically the personal management messages of the relevant client device, namely assigned to this client device only.

Then, the client device may send a new notification 15 to the server, typically to request further management messages pertaining to this client device, if any. In the example of FIG. 2, since three management messages MM1, MM2, MM3 have been transmitted to the client device via the last answer A, there is at least one management message MM4 to be still transmitted to the client device. This can be determined by the server thanks to the data comprised in the confirmation 15' given that this data is based on the token or derived from this token and that the token includes the second marker 44, which allows the server to determine the last management message that was transmitted to the client device in accordance with the present example. Accordingly, the server has no requirement to store the token 45, even it could, given that the relevant information, i.e. the client device identifier 11 and the marker allowing to identify the most recent management message sent to this client device, has been previously included into the token 45 when it had been generated. In other words, the second set 42 is preferably determined according to the second marker 44.

From the above example disclosed in connection with FIG. 2, one can note that one embodiment of the method may comprise the following features:

each management message 40 of the first set 41 is associated with a first marker 43 configured to determine when this management message has been generated,     the token 45 includes at least one of: the client device identifier 11 and a second marker 44, this second marker being configured to determine the most recent management message transmitted to the client device 10, and     the second set 42 is determined according to the second marker 44.

It should be also noted that timestamps have been mentioned above as example of markers 43, 44. However, such markers may comprise other kind of data, such as a sequence counter value or any identifier that permit to know in which order the management messages have been generated.

According to one embodiment, the first communication channel 51 is a broadcast or multicast channel, and the second communication channel 52 is a unicast channel, preferably a bidirectional channel.

Among the management messages 40 transmitted through the first communication channel 51 in a repetitive manner (i.e. those typically stored in the carousel 25), some of them may be personal or individual messages assigned to a specific client device only, and others may be management messages pertaining to several client devices. The latter may refer to global or shared management messages.

Accordingly, one can note that the second set 42 may comprise management messages 40 pertaining to at least the relevant client device 10, namely personal management messages pertaining to this client device and non-personal management message, such as shared or global management messages, pertaining to the client device and to at least one another client device. If there are management messages that concern more than one client device, then they should not be removed from the carousel 25. Sorting personal management messages from non-personal management message may be performed e.g. using an identifier or a specific tag. It should be further noted that non-personal management messages already transmitted to the client device through the first or second set, will no longer be transmitted to the client device, despite the fact that they are not removed by the server from the transmission through the first communication channel.

According to another embodiment, the confirmation 15' occurs if a processing of the management messages of the second set 42 is successful. Thanks to this feature, the server can be sure that the management messages of the second set 42 have not only been safely received by the client device, but that they have also been correctly processed by the client device, in particular by the security module 12 of this device. The processing of such management messages may include several steps, for instance the transmission of the messages from the client device to its security module, the decryption of the management messages if they have been received in an encrypted form, the extraction of data comprised in these messages and the use of such data by the client device. If the management messages relate to EMMs, the use of data comprised in these messages may relate to renew or get access rights required to descramble multimedia contents for example.

According to another embodiment, the notification 15 occurs at certain conditions or events. These conditions or events may include the following:

A) only once during a configurable period of the client device 10,     B) upon an expiration of a predetermined or random delay after powering on the client device 10,     C) after receiving an authorization for sending the notification,     D) when at least one access right assigned to the client device 10 to access to a multimedia content is expired or will about expire.

The condition A may allow avoiding any avalanche effect.

The condition B intends to prevent issues that may be caused if e.g. a regional electricity power blackout occurs. Indeed, in such a case, millions of client devices could connect at the same time when power goes back. Thanks to the condition B, simultaneous connection of a huge number of client devices may be avoided.

The condition C refers to an authorization which may be a message, e.g. a management message, specifically targeted to a particular client device. This condition may be used to ensure that the connected client devices will do the necessary step to remove their messages as soon as possible. A delay of few minutes after the client device received this authorization may further added to ensure that all the management messages pertaining to this client device have been generated.

The condition D rather refers to the case where the management messages are EMMs. An access right may be regarded as being about to expire e.g. if it will expire within one week, preferably within less than six, five, four, three, two days, still preferably within less than a day.

According to a preferred embodiment, conditions or events A and B prevail over the other conditions or events.

One can further note that the management messages 40 may be encrypted, e.g. using a personal key pertaining to the client device if these messages are those comprised in the second set 42. In addition, it should be noted that the management messages pertaining to the client device 10 and retrieved by the server from the carousel 25 are preferably stored therein in a chronological order and successively retrieved (one after the other) from the oldest to the most recent management message. Moreover, in addition to the client device identifier 11 and data pertaining to the token (e.g. the token signature), the confirmation 15' may also comprises the token itself.

Figure 3:
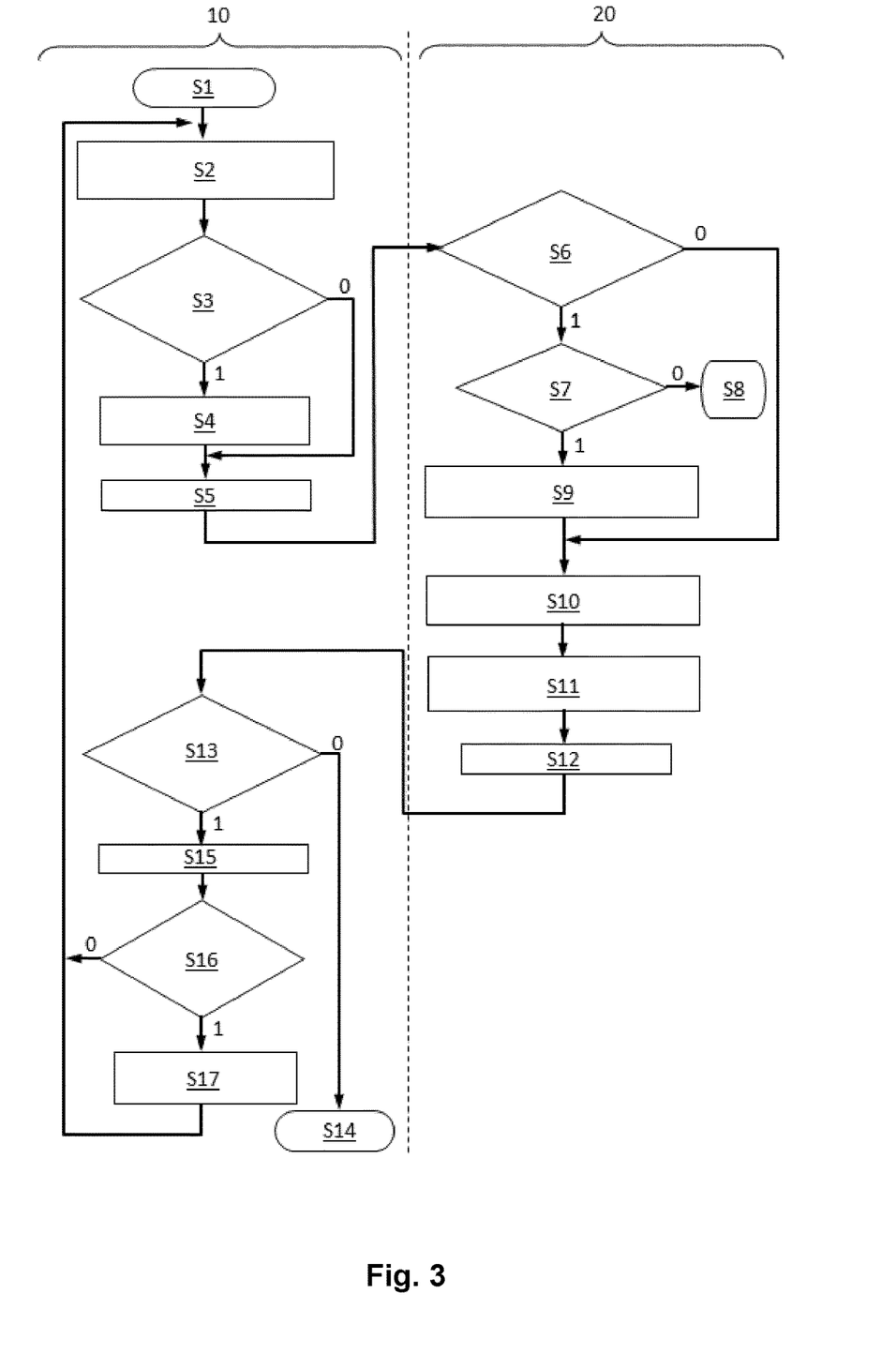
FIG. 3 is a flow chart of the method according to a particular or more specific embodiment.

FIG. 3 is a flow chart of the method according to a particular or more specific embodiment. The left side of the diagram shown in this figure refers to steps performed at the client device 10 and the right side to steps performed at the server 20. The steps shown in this diagram may be those of a routine that allows the implementation of the method according to this specific embodiment. This routine can be executed several times in successive rounds, as shown by one arrow which goes back at the beginning of the routine.

The first step S1 corresponds to the launch or start of the routine. At the second step S2, the client device generates a request which may be the notification 15 since this request comprises the client device identifier 11 and may, if any, further include a token signature, more specifically if the client device decides to include such a token signature in the client request.

At the third step S3, the client device checks if it already has a recent token signature, e.g. stored in one of its memories. The adjective recent means that the signature has been generated at the last round of the routine. If so (see the binary number 1 corresponding to a positive answer "yes") the client device further adds the token signature in the request at step S4. However, if the answer is "no" (see the binary number 0), no signature is added to the request and the client device goes to step S5 where the request is sent to the server.

At step S6, the server checks whether the request comprises a token signature. If the request has no signature, the server goes to step S10, otherwise it checks, at step S7, if the request is valid (i.e. authentic). Such a step may comprise checking the validity of the token signature and, if so, it may further comprise checking the validity of the token. Checking the validity of the token may be achieved by checking whether the token 45 is assigned to the client device identifier 11, and/or checking whether the token signature has been derived from the last token 45 provided to the client device 10. If the answer to step S7 is "no", i.e. if the request is not valid, the server may merely abort the routine, as shown at step S8, or it may undertake countermeasures. Otherwise, i.e. if the request is valid, the server delete, from the carousel 25 (directory), at least a part of the management messages sent within a last response to the client device, i.e. comprised in the response sent to the client device at step S12 of the previous round. Instead of deleting these management messages, the server may prevent any further transmission of these messages to the client device 10. More specifically, the deleted management messages or the management messages that are prevented from any further transmission, relate to personal messages of the relevant client device 10.

At step S10, the server retrieves, from the carousel 25 (or the management message directory), management messages assigned to the client device 10, more specifically at least assigned to this client device so as to include shared and global management messages for which the relevant client device is at least assigned. Then, the server generates at step S11 a token (i.e. a new token) and a response (i.e. an answer to the client request). This response comprises the management messages retrieved from the carousel and the newly generated token 45. At step S12, the server sends this response to the client device 10.

Upon receipt of the response, the client device checks at step S13 whether this response comprises at least one management message 40. If the answer is "no", the routine ends at step S14. Otherwise, the client device processes, at step S15, the management messages received in the server response and checks, at step S16, whether this processing is successful. If the management message processing cannot be done with success, the client device goes back to the beginning of the routine for generating a new request. Otherwise, the client device signs the token to obtain a new token signature at step S17 and then the routine restarts at the beginning.

From the foregoing, one can note that the aforementioned request can be used as notification 15, for requesting the server to provide management messages pertaining to the client device, as well as confirmation 15' (acknowledgment) for receiving, from the client device, data (e.g. signature) pertaining to the token. Accordingly, the notification 15 and the confirmation 15' may be a single client message (i.e. the same type of message) usable, on the one hand, to request management messages from the server and, on the other hand, as acknowledgment to confirm the server that the requested management messages have been duly processed at the client device and therefore can be removed from the carousel or at least from the transmission performed repeatedly through the first communication channel 51.

It should be also noted that if the request does not comprise the token signature (output "no" at step S6), it may mean that the client device 10 asks for receiving all the management messages belonging to it. Therefore, if the client device has no token or if it decides to receive all the management messages assigned to it, its request (i.e. the notification 15) will be sent without any token, token signature or data pertaining to the token. Accordingly, omitting data pertaining to the token in the request may be a deliberate action undertaken by the client device. It should be also noted that one may replace the token signature with any data pertaining to the token 45, deriving from this token or based on this token. As example, the token signature may be replaced by the token itself or an encryption of the token, even a hash of this token.

One can also note that if there is no management message retrievable at step S10 by server 20 from the directory or carousel 25 (e.g. because all the management messages pertaining to the client device have been transmitted to the latter), the response generated at step S11 will only comprise the token 45. Alternatively, the routine may be configured to generate a token only if some management messages pertaining to the client device can be retrieved at step S10. In this case, if no management messages can be retrieved, the response will be an empty response.

Furthermore, starting or launching this routine may also depend on the events or conditions A-D which where previously mentioned.

According to another aspect, the present solution also relates to a server 20 configured for implementing the aforementioned method in accordance with any of its embodiments or with any possible combination of embodiments or ways disclosed above. More specifically, the present solution also relates to a server 20 for controlling access to audio/video content and providing at least one client device 10 with management messages 40. To this end and as schematically shown on FIG. 1, said server 20 comprises:

- a unit 21 configured to determine the first set 41 of management messages 40 pertaining to the client device 10 by selecting management messages assigned to said client device 10 among a plurality of management messages 40 assigned to a plurality of client devices,
- at least one communication interface 24 configured to transmit this first set 41 through the first communication channel 51, in a repetitive manner so as to repeat the transmission of said first set 41 of management messages, and to receive a notification 15 from the client device 10, this notification 15 comprising the client device identifier 11 and being a request for receiving management messages 40 assigned to the client device 10,
- at least one processing unit 27 configured to determine the second set 42 of management messages 40, this second set 42 comprising all or part of the first set 41 of management messages, and to determine a token 45 associated with this second set 42.

In addition, the communication interface 24 is further configured to receive the confirmation 15' from the client device 10, this confirmation 15' comprising the data pertaining to the token 45 and, preferably, this confirmation 15' further comprises the client device identifier 11. Furthermore, the processing unit 27 is also configured to verify the data pertaining to the token 45 and, in case of positive verification, to remove the second set 42 of management messages 40 from the transmission through the first communication channel 51.

According to one embodiment, the communication interface 24 is linked to the second communication channel 52 for exchanging therethrough at least one of: the notification 15; the token 45; the second set 42 of management messages and the confirmation 15'.

Furthermore, the server 20 may comprise a cryptographic unit configured to achieve cryptographic or hash operations on data or messages exchanged through the aforementioned at least one communication interface 24. The server 20 may also comprise a memory 29 or any storage unit in addition to the carousel 25. Such a storage unit 29 may be configured to store data such as the client device identifier 11, the client device communication address, the token 45, data pertaining to this token, hash or cryptographic functions, cryptographic keys, markers 43, 44, notifications 15 (requests), confirmations 15' (answers or acknowledgments) or any content comprised in these notifications or confirmations. Any data stored in connection to a specific client device may be stored in a record assigned to this client device. Such a record may be further identified using the client device identifier 11, for example.

According to one embodiment, the client device 10 may further comprise a second communication interface linked to the second communication channel 52 and configured for the transmission, through said channel 52, of at least one of: the notification 15, the token 45, the second set 42 of management messages and the confirmation 15'.

According to another aspect, the present solution also relates to a client device 10 configured for implementing the method disclosed above in accordance with any of its embodiments or with any possible combination of embodiments or ways disclosed in this description. More specifically, the present solution also relates to a client device 10 for receiving management messages 40 provided by a server 20 configured to control access to audio/video content. This client device 10 comprising:
- at least one communication interface 14 configured to:
  - receive, through the first communication channel 51, a first set 41 of management messages 40 pertaining to this client device 10,
  - transmit a notification 15 to the server 20, this notification 15 comprising at least the client device identifier 11 and being a request for receiving management messages 40 assigned to said client device 10,
  - receive a second set 42 of management messages 40, this second set 42 comprising all or part of the first set 41 of management messages,
- at least one processing unit 17 configured to:
  - generate the notification 15,
  - process the second set 42 of management messages and, in case of successful processing, determine a confirmation 15' comprising data pertaining to the token 45 and, preferably, the client device identifier 10.

In addition, the aforementioned communication interface 14 is further configured to send the confirmation 15' to the server 20.

According to one embodiment, the client device 10 further comprises a security module 12 configured to carry out cryptographic operations for descrambling multimedia contents using conditional access messages 40', such as ECMs and EMMs for instance. This security module 12, or an additional cryptographic unit, may be further configured to perform other cryptographic or hash operations, for example onto data or messages exchanged with the server.

According to a preferred embodiment, the communication interface 14 is further linked to the second communication channel 52 for exchanging therethrough at least one of: the notification 15, the token 45, the second set 42 of management messages and the confirmation 15'.

According to one embodiment, the client device may further comprise a memory 19 or any storage unit. Such a memory 19 may be configured to store the client device identifier 11, the server communication address, the token 45, data pertaining to this token, hash or cryptographic functions, cryptographic keys, any markers 43, 44, notifications 15 (requests), confirmations 15' (answers or acknowledgments) or any content comprised in these notifications or confirmations. Furthermore, the memory 19 may be a secure memory, namely a tamper-proof storage unit.

In accordance with a particular embodiment, the processing unit 17 of the client device 10 may be further configured to generate the token 45 associated to the second set 42. Furthermore, the second set 42 may also be generated by the client device 10, in particular if the token 45 is generated by the processing unit 17.

According to another aspect, the present solution also relates to a system for providing at least one client device 10, from a server 20, with at least one management message 40 assigned to the client device 10. In this system, the server 20 and the client device 10 are configured according to any related embodiment or possible combination of embodiments disclosed in the present description.

Final Considerations

Although an overview of the inventive subject matter has been described with reference to specific example embodiments, various modifications and changes may be made to these embodiments without departing from the broader spirit and scope of embodiments of the present invention. For example, various embodiments of features thereof may be mixed and matched or made optional by a person of ordinary skill in the art. Therefore, the Detailed Description is not to be taken in a limiting sense, and the scope of various embodiments is defined only by the appended claims, along with the full range of equivalents to which such claims are entitled.

The invention claimed is:

1. A method for providing at least one client device, from a server configured to control access to audio/video content, with management messages, comprising:
   determining a first set of management messages pertaining to said client device by selecting management messages assigned to said client device among a plurality of management messages assigned to a plurality of client devices, wherein the management messages comprise access data for getting access to the audio/video content;
   transmitting said first set of management messages through a first communication channel in a repetitive manner, so as to repeat the transmission of said first set of management messages,
   receiving a notification from said client device, said notification comprising at least a client device identifier and being a request for receiving management messages assigned to the client device,
   determining a second set of management messages, said second set comprising all or part of the first set of management messages,
   determining a token associated with the second set of management messages and configured to identify said second set of management messages,
   receiving a confirmation from the client device, said confirmation comprising data pertaining to the token,
   verifying the data pertaining to the token and, in case of a positive verification, removing all or part of the second set of management messages from the transmission through the first communication channel.

2. The method of claim 1, wherein:
the token is derived from the second set of management messages, and
the token and the second set are determined by the server and/or by the client device.

3. The method of claim 1, wherein the token is further transmitted to the client device if the token and the second set have been determined by the server.

4. The method of claim 3, wherein the second set of management messages is further transmitted to the client device.

5. The method of claim 1, wherein at least one of the notification, the token, the second set of management messages and the confirmation is transmitted through a second communication channel.

6. The method of claim 1, wherein at least one of the notification, the token, the second set of management messages and the confirmation is transmitted through an encrypted form.

7. The method of claim 1, wherein said data pertaining to the token comprises at least one of: the token itself, a signature of the token, a token encryption, and a token signature encryption.

8. The method of claim 4,
each management message of the first set is associated with a first marker configured to determine when the management message has been generated,
the token includes at least one of: the client device identifier and a second marker, said second marker being configured to determine the most recent management message transmitted to the client device, and
the second set is determined according to the second marker.

9. The method of claim 8, wherein the management messages of the first set are stored in a chronological order.

10. The method of claim 5, wherein the first communication channel is a broadcast or multicast channel, and the second communication channel is a unicast channel.

11. The method of claim 1, wherein the second set comprises management messages pertaining to at least said client device.

12. The method of claim 1, wherein the confirmation occurs if a processing of the management messages of the second set is successful.

13. The method of claim 1, wherein receiving the notification occurs:
only once during a configurable period of the client device,
upon an expiration of a predetermined or random delay after powering on the client device,
after receiving an authorization for sending the notification,
when at least one access right assigned to said client device to access to a multimedia content is expired or will expire within one week, preferably within less than six, five, four, three two days, still preferably within less than a day.

14. A server for controlling access to audio/video content and providing at least one client device with management messages, said server comprising:
a unit configured to determine a first set of management messages pertaining to said client device by selecting management messages assigned to said client device among a plurality of management messages assigned to a plurality of client devices, said management messages comprising access data for getting access to said audio/video content;
at least one communication interface configured to transmit said first set through a first communication channel, in a repetitive manner so as to repeat the transmission of said first set of management messages, and to receive a notification from said client device, said notification comprising a client device identifier and being a request for receiving management messages assigned to the client device,
at least one processing unit configured to:
determine a second set of management messages, said second set comprising all or part of the first set of management messages,
determine a token associated with the second set of management messages and configured to identify said second set of management messages,
the communication interface being further configured to receive a confirmation from the client device, said confirmation comprising the client device identifier and data pertaining to the token, and
the processing unit being further configured to verify said data pertaining to the token and, in case of positive verification, to remove the second set of management messages from the transmission through the first communication channel.

15. A client device for receiving management messages provided by a server configured to control access to audio/video content, said client device comprising:
at least one communication interface configured to:
receive, through a first communication channel, a first set of management messages pertaining to said client device, said management messages comprising access data for getting access to said audio/video content;
transmit a notification to the server, said notification comprising at least a client device identifier and being a request for receiving management messages assigned to said client device,
receive a second set of management messages, said second set comprising all or part of the first set of management messages,
at least one processing unit configured to:
generate said notification,
process the second set of management messages and, in case of successful processing, determine a confirmation comprising the client device identifier and data pertaining to a token configured to identify said second set of management messages,
the communication interface being further configured to send the confirmation to the server.

* * * * *